(12) United States Patent
Lengert

(10) Patent No.: US 8,272,217 B2
(45) Date of Patent: Sep. 25, 2012

(54) METHOD AND DEVICE FOR CARRYING OUT A THERMODYNAMIC CYCLIC PROCESS

(75) Inventor: Jörg Lengert, Lonnerstadt-Ailsbach (DE)

(73) Assignee: Siemens Aktiengesellschaft, München (DE)

( * ) Notice: Subject to any disclaimer, the term of this patent is extended or adjusted under 35 U.S.C. 154(b) by 1356 days.

(21) Appl. No.: 10/558,894

(22) PCT Filed: Apr. 13, 2005

(86) PCT No.: PCT/EP2005/051617
§ 371 (c)(1),
(2), (4) Date: Nov. 30, 2005

(87) PCT Pub. No.: WO2005/100755
PCT Pub. Date: Oct. 27, 2005

(65) Prior Publication Data
US 2007/0022753 A1    Feb. 1, 2007

(30) Foreign Application Priority Data

Apr. 16, 2004    (DE) .................. 10 2004 018 627

(51) Int. Cl.
F01K 25/06    (2006.01)
(52) U.S. Cl. .............................. 60/649; 60/651; 60/671
(58) Field of Classification Search .................. 60/651, 60/653, 671, 655, 676, 649
See application file for complete search history.

(56) References Cited

U.S. PATENT DOCUMENTS

| 5,953,918 A * | 9/1999 | Kalina et al. .................. 60/653 |
| 6,820,421 B2 * | 11/2004 | Kalina ........................... 60/649 |
| 6,829,895 B2 * | 12/2004 | Kalina ........................... 60/649 |
| 2004/0055302 A1 | 3/2004 | Kalina |

FOREIGN PATENT DOCUMENTS

| EP | 0 649 985 A1 | 4/1995 |
| EP | 0652368 A1 | 10/1995 |
| EP | 1 058 069 A1 | 12/2000 |

(Continued)

OTHER PUBLICATIONS

H.M.. Leibowitz, N. Zervos, "Installation and Early Test Results of a 3 MW Kalina Cycle Demonstratin Plant", Proceedings of the 27th Intersociety Energy Conversion Engineering Conference, San Diego, CA, Aug. 3-7, 1992, pp. 335-342, vol. 3, Conf. 27, XP000392711.

(Continued)

Primary Examiner — Hoang Nguyen

(57) ABSTRACT

In accordance with the invention, to reduce the complexity of a cycle process, a liquid working medium flow (13) is brought up to an increased pressure and through part condensation of an expanded working medium flow (12) a first partly vaporized working medium flow (15) is created. Through further vaporization of the first partly vaporized working medium flow (15) with heat which is transferred from an external heat source (20), a second at least partly vaporized working medium flow (18) is created. In this second at least partly vaporized working medium flow (18) the vapor phase (10) is separated from the liquid phase (10), subsequently the energy of the vapor phase (10) is converted into a usable form and an expanded vapor phase (11) created. The expanded vapor phase (11) is mixed with the liquid phase (19) and the expanded working medium flow (12) is formed. Through complete condensation of the partly condensed, expanded working medium flow (12a) the liquid working medium flow (13) is obtained in its turn.

20 Claims, 4 Drawing Sheets

FOREIGN PATENT DOCUMENTS

| | | |
|---|---|---|
| EP | 1 070 830 A1 | 1/2001 |
| JP | 10205308 A | 8/1998 |
| SU | 375452 A1 | 3/1973 |
| WO | 2004/027325 A2 | 4/2004 |

OTHER PUBLICATIONS

Leibowitz H. M. et al., "Installation and Earty Test Results of a 3 MW Kanila Cycle Demonstration Plant", Conversion Technologies Electrochemical Conversions, San Diego, CA, Aug. 3, 1992, vol. 3, Conf. 27, pp. 335-342, XP000392711.

Henry Mlcak et al., "Notes from the North: a Report on the Debut Year of the 2 MW Kalina Cycle Geothermal Power Plant in Husavik, Iceland", GRC Husavik Paper, Apr. 26, 2002, pp. 1-7.

Henry A. Mlcak, "Design and Start-Up of the 2MW Kalina Cycle Orkuveita Husavikur Geothermal Power Plant in Iceland", European Geothermal Energy Council 2nd Business Seminar, Mar. 1, Altheim, Austria, 2001, pp. 1-8.

Leibowitz H. M. et al., "Installation and Early Test Results of a 3 MW Kanila Cycle Demonstration Plant", Conversion Technologies Electrochemical Conversions, San Diego, CA, Aug. 3, 1992, vol. 3, Conf. 27, pp. 335-342, XP000392711.

Wall et al., "Exergy Study of teh Kalina Cycle", published in R.A. Bajuira, M.R. von Spakovsky and E.S. Geskin Eds., Analysis and Design of Energy Systems: Analysis of Industrial Processes, 1989, pp. 73-77, AES-vol. 10-3, ASM.E.

\* cited by examiner

METHOD AND DEVICE FOR CARRYING OUT A THERMODYNAMIC CYCLIC PROCESS

CROSS REFERENCE TO RELATED APPLICATIONS

This application is the US National Stage of International Application No. PCT/EP2005/051617, filed Apr. 13, 2005 and claims the benefit thereof. The International Application claims the benefits of German application No. 10 2004 018 627.8, filed Apr. 16, 2004, both applications are incorporated by reference herein in their entirety.

FIELD OF INVENTION

The invention relates to a method and a device for executing a thermodynamic cycle process.

SUMMARY OF THE INVENTION

Thermal power stations use thermodynamic cycle processes for converting heat into mechanical or electrical energy. Conventional thermal power stations create the heat by burning fuel, in particular the fossil fuels coal, oil and gas. The cycle processes are operated in this case for example on the basis of the classic Rankine cycle process with water as its working medium. Its high boiling point however makes water unattractive, especially when using heat sources with temperatures between 100° to 200° C., e.g. geothermal liquids or waste heat from combustion processes, because the process is not cost effective.

For heat sources with such a low temperature a wide diversity of technologies have been developed over recent years which make it possible to convert their heat into mechanical or electrical energy with a high degree of efficiency. As well as the Rankine process with organic working media (Organic Rankine Cycle, ORC) a process known as the Kalina cycle process stands out by virtue of its markedly better levels of efficiency compared to the classic Rankine process. Various cycles for different applications have been developed on the basis of the Kalina cycle process. Instead of water these cycles use a mixture of two substances (e.g. ammonia and water) as their working medium, with the non-isothermic boiling and condensation process of the mixture being utilized to increase the efficiency of the cycle by comparison with the Rankine cycle.

For temperatures of the heat source of 100 to 140° C. the Kalina cycle KCS 34 (Kalina Cycle System 34) is preferably used, which is employed for example in the geothermal power plant at Husavik in Iceland. In this cycle (see also FIG. 3) a liquid working medium is pumped into a first heat exchanger where it is heated up by a part condensation of an expanded working medium. The heated working medium flow produced in this way is then further heated up by cooling the liquid phase of a partly vaporized working medium flow in a second heat exchanger and subsequently partly evaporated (e.g. to a liquid content of 14-18%) in a third heat exchanger using heat transmitted from an external heat source (e.g. a geothermal liquid). Then the liquid phase of the partly evaporated working medium flow is separated from the vaporized phase in a separator.

The vaporized phase is expanded in a turbine and its energy is used for generating power. The liquid phase is directed through the second heat exchanger and used for further heating of the heated working medium flow. In a mixer the liquid phase and the expanded vapor phase are merged and the expanded working medium flow already mentioned is formed. The expanded working medium flow is subsequently partly condensed in the first heat exchanger and finally fully condensed in a condenser so that the liquid working medium flow mentioned at the start is created and the cycle is completed.

Using this known cycle process as its starting point, the object of the present invention is to specify a method and a device for executing a thermodynamic cycle process, which, with the same external heat source and cooling water temperature, and with plant costs which essentially remain the same, makes it possible to produce the same or even a higher yield of mechanical and/or electrical energy, but with the method and the device standing out however by virtue of their lower complexity.

The object is achieved by the claims.

In accordance with the invention, by part condensation of the expanded flow of working medium the pressurized liquid flow of working medium is not only heated up but even partly evaporated. This is possible because, by comparison with the KCS 34 cycle mentioned at the start, the second heat exchanger and thereby the transmission of heat from the liquid phase of the partly vaporized working medium flow for further heating or for part vaporization of the of the heated working medium flow is dispensed with. This removes less heat in the liquid phase which is subsequently used for better heating and partial vaporization of the pressurized liquid working medium flow by part condensation of the expanded working medium flow.

By suitably adapting the heating surfaces of the remaining heat exchangers and other cycle parameters it is possible not only to keep the yield of mechanical and/or electrical energy the same by comparison with the known cycle but even to increase it. The costs of a possibly increased heating surface demanded in the remaining heat exchangers could in this case be largely compensated for by the omission of the second heat exchanger and the associated simplification of the pipework, thus keeping the plant costs essentially the same.

By dispensing with the second heat exchanger mentioned at the start or dispensing with a heat transfer from the liquid phase to the first partly vaporized working medium flow, the device or the method in accordance with the invention stand out because of they are less complex by comparison with the prior art.

The part vaporization of the pressurized, liquid working medium flow by part condensation of the expanded working medium flow can be favorably improved by the pressure of the vaporized phase amounting to less than 24 bar and thereby being far less than the 33 bar figure known from previous cycles. In this way the overall pressure level in the cycle can be reduced, which enables the boiling temperature of the working medium in its turn to be reduced.

When the pressure of the vapor phase before entry into the turbine is three times as great as pressure of the expanded vaporized phase it is also possible to use conventional single-stage expander turbines. These types of expander turbines have levels of efficiency of up to 88% and thereby far greater levels of efficiency than the multi-stage expander turbines previously used in these types of cycles, e.g. designed for a maximum pressure of 33 bar with levels of efficiency of appr. 75%. A loss in the degree of efficiency possibly associated with a reduction in the pressure level or the lower pressure ratios over the expander turbine in the cycle is ther by more than compensated for by the better efficiency of the turbine and the greater possible throughput of working medium which allows comparably more energy to be extracted from the thermal water.

When a conventional single-stage expander turbine is used, the costs of a second turbine stage or the additional costs for a specific turbine design for high differences in pressure are also not incurred.

In accordance with an embodiment of the invention a multi-substance mixture is used as the working medium. The multi-substance mixture is preferably a two-substance mixture especially an ammonium-water mixture. As a result of the non-isothermic vaporization and condensation of such a mixture an especially high level of efficiency of the cycle can be achieved.

Energy can be obtained in an especially environmentally friendly way by using a geothermal liquid, especially thermal water from a geothermal source, as the heat source. Waste gases (exhaust gases) from gas and/or steam turbine plants can also be used as a heat source or heat generated in industrial production processes (e.g. in steel production) can be used.

A high level of efficiency of this cycle can in this case be achieved by the heat source having a temperature of 100° C. to 200° C., especially 100° C. to 140° C.

The invention as well as a further advantageous embodiments of the invention in accordance with the features of the dependent claims are explained in more detail below with reference to exemplary embodiments in the figures.

DETAILED DESCRIPTION OF INVENTION

Figure 1:
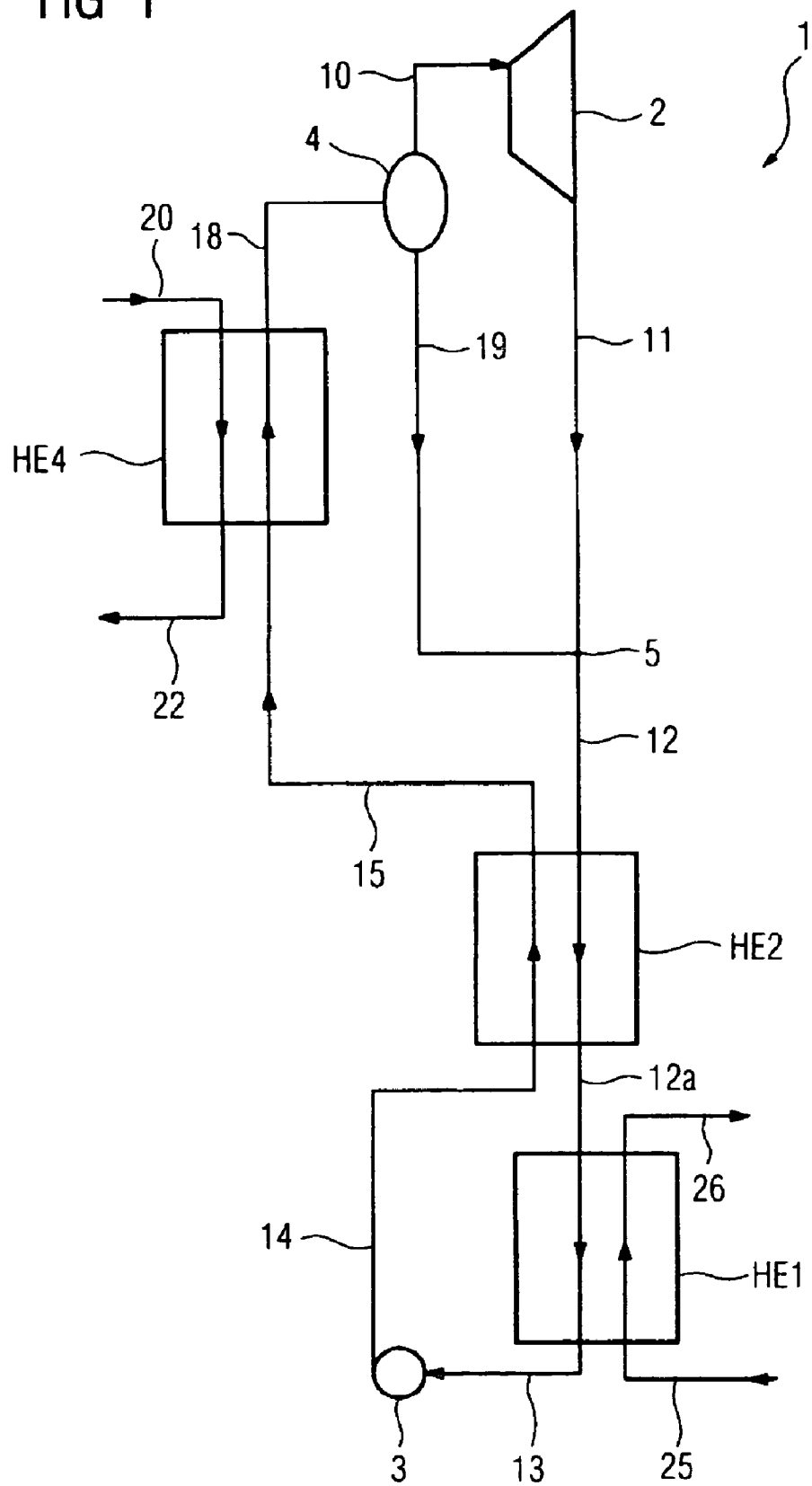
FIG. 1 shows a circuit of an inventive device for executing a thermodynamic cycle process in a simplified schematic presentation.

The device 1 shown in FIG. 1 for executing a thermodynamic cycle process features a (recuperative) heat exchanger HE4, which on the primary side has hot thermal water 20 from a geothermal source not shown in any greater detail flowing through it and is connected on the secondary side on the one hand to a heat exchanger HE2 and on the other hand to a separator 4. The separator 4 is used for separating a vapor phase from a liquid phase of a partly vaporized working medium. A vapor-side output of the separator 4 is connected to a turbine 2. The turbine 2 is connected on its output side to a mixer 5 which is still connected with a liquid input of the separator 4. On the output side the mixer 5 is connected to the secondary side of a (recuperative) heat exchanger HE2 which in its turn is connected to the primary side of a condenser HE1 through which cooling water flows. The condenser HE1 is connected at its primary-side output, if necessary via a condensing tank, via a pump 3 to the primary side of the heat exchanger HE2. The primary side of the heat exchanger HE2 is in its turn connected to the secondary side of the heat exchanger HE4 already mentioned.

A two-substance mixture of water and ammonia is used as the working medium in the device 1, which thus exhibits at non-isothermic vaporization and condensation. After the condenser HE1 the working medium is in a liquid state as a liquid working medium flow 13. With the aid of the pump 3 the entire flow of liquid working medium 13 is pumped up to a higher pressure and a pressurized liquid working medium flow 14 is created.

The pressurized liquid working medium flow 14 is fed to the primary side of the heat exchanger HE2 and heated up and partly vaporized by part condensation of a secondary-side expanded working media flow 12 fed through the heat exchanger HE2, so that on the primary side after the heat exchanger HE2 a first partly vaporized flow of working medium 15 and on the secondary side a partly-condensed, expanded flow of working medium 12a are present. The proportion of vapor in the first partly vaporized flow of working medium 15 is 15% for example.

The first partly vaporized flow of working medium 15 is fed without further heating to the secondary side of the heat exchanger HE4.

On the primary side hot thermal water 20 flows through the heat exchanger HE4. In the heat exchanger HE4 the first partly vaporized working medium flow 15 is further vaporized by the cooling down of the thermal water 20 and a second partly vaporized working medium flow 18 created. The second partly vaporized working medium flow 18 is fed to the separator 4, in which the vapor phase 10 is separated from the liquid phase 19 of the second partly vaporized working medium flow 18. The vapor phase 10 is subsequently expanded in the turbine 2 and its energy is converted into a usable form, e.g. into current by a generator not shown in the figure and an expanded vapor phase 11 created.

In the mixer 5 the expanded vapor phase 11 and the liquid phase 19 separated off in the separator 4 are merged again and an expanded working medium flow 12 is formed.

In this case no provision is made for an explicit transfer of heat from the liquid phase 19 to the first partly vaporized working medium flow 15, e.g. by means of a heat exchanger provided specifically for the purpose. The partly vaporized working medium flow 15 thus, before its further vaporization in heat exchanger HE4, has essentially the same temperature as it does after its creation by part condensation of the expanded working medium flow 12. "Essentially the same temperature" is taken in this case to mean that the temperature difference only amounts to a few Kelvin and is caused for example by a slight cooling down of the first partly vaporized working medium flow leaving heat exchanger HE2 as a result of heat losses in the connecting pipes to heat exchanger HE4.

The expanded working medium flow 12 is partly condensed in heat exchanger HE2 and a partly condensed, expanded working medium flow 12a created. The partly condensed, expanded working medium flow 12 is subsequently condensed in condenser HE1 with the aid of the (incoming) flow of cooling water 25 and the liquid working medium flow 13 created. The heat transferred by the condensation of the expanded working medium flow 12a to the cooling water flow 25 is removed by the outgoing cooling water flow 26.

Figure 2:
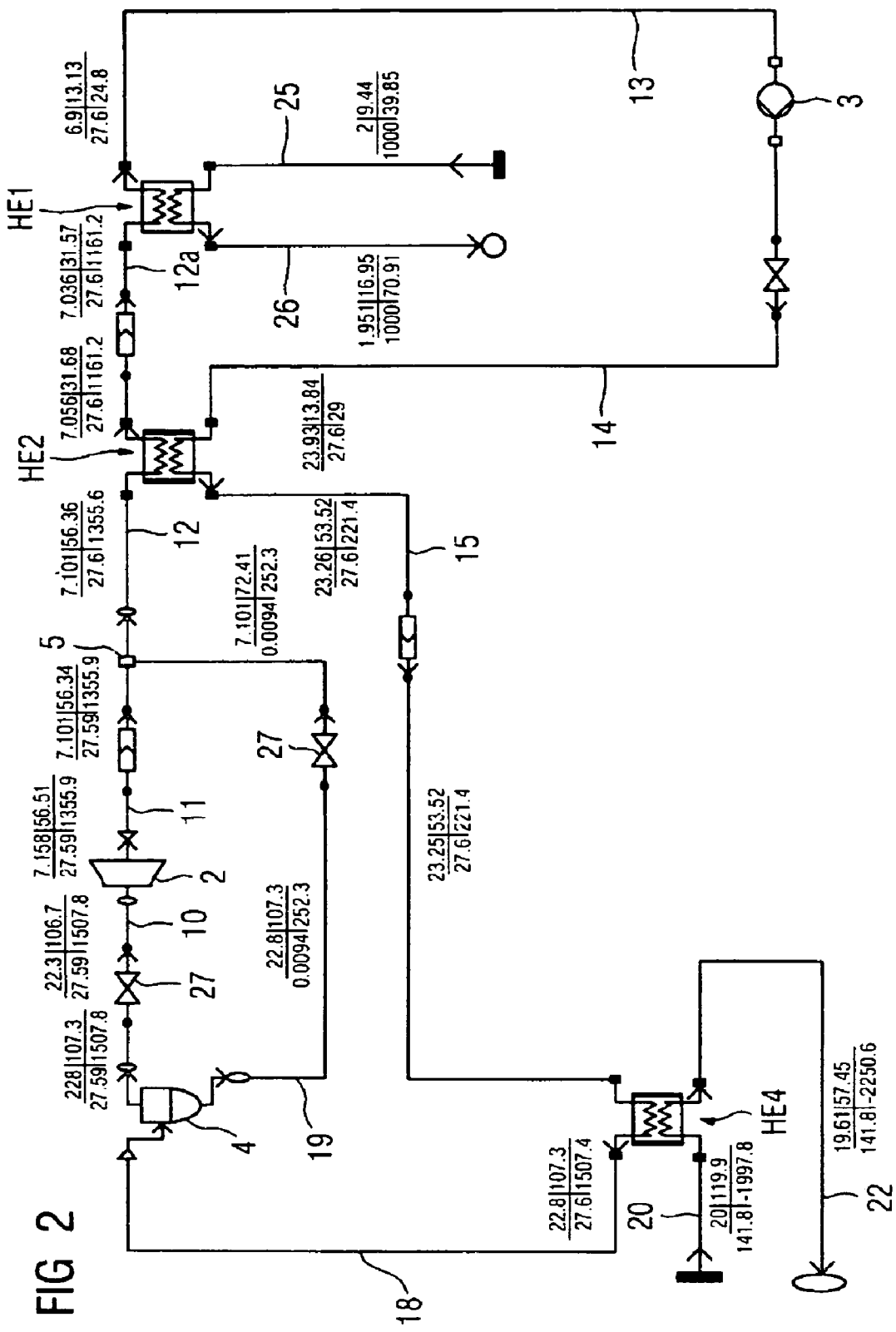
FIG. 2 shows a cycle calculation for a device in accordance with FIG. 1.

FIG. 2 shows a cycle calculation for a device for execution of the thermodynamic cycle process, which essentially corresponds to the device shown in FIG. 1 and has additionally only been supplemented by a number of valves 27. As initial conditions for the calculations an ammonia concentration in the water of 95% (with a liquid, fully condensed working medium flow) and a thermal waster flow 20 with a temperature of 120° C. as well as a mass flow of 141.8 kg/s are assumed. The temperature of cooling water flow 25 is 9.4° C. As can be seen from FIGS. 1 and 2, there is no provision for changes in the concentration of ammonia to increase the level of efficiency, apart from through the separation of the vapor phase from the liquid phase after the heat transfer from the external heat source into the ammonia concentrations which are different in the two phases.

Table 1 shows for a number of selected steams of the cycle the result of the cycle calculation, with the power of the heat exchangers being selected in accordance with Table 2.

TABLE 1

| Flow | Temperature (° C.) | Enthalpy (kJ/kg) | Mass flow (kg/s) | Pressure (bar) |
|---|---|---|---|---|
| 10 | 106.7 | 1507.8 | 27.59 | 22.3 |
| 11 | 56.51 | 1355.9 | 27.59 | 7.158 |
| 13 | 13.13 | 24.8 | 27.6 | 6.9 |
| 15 | 53.52 | 221.4 | 27.6 | 23.26 |
| 20 | 119.9 | −1997.8 | 141.8 | 20 |
| 22 | 57.45 | −2250.6 | 141.8 | 19.61 |

TABLE 2

| Heat exchanger | Power (kW) |
|---|---|
| HE1 (condenser) | 31.0 |
| HE2 | 5.3 |
| HE4 | 34.5 |
| Total | 70.8 |

The temperature of the first partly vaporized working medium flow 15 before entry into the heat exchanger HE4 is 53,52° C. and is thus the same temperature as after leaving the heat exchanger HE2. The electrical power which can be generated under these conditions with the aid of the turbine 2 amounts to 4033 kW.

The pressure of the vapor phase 10 before entry into the turbine 2 amounts to 22.3 bar and the pressure of the expanded, vapor phase 11 on exit from the turbine 2 amounts to 7.158 bar. The selected inlet pressure of 22.3 bar and the pressure ratio of appr. 3.1 between the pressure of the vapor phase before and after the turbine 2 enables a conventional single-stage high-efficiency turbine to be used as turbine 2, with the associated cost and efficiency level benefits.

Figure 3:
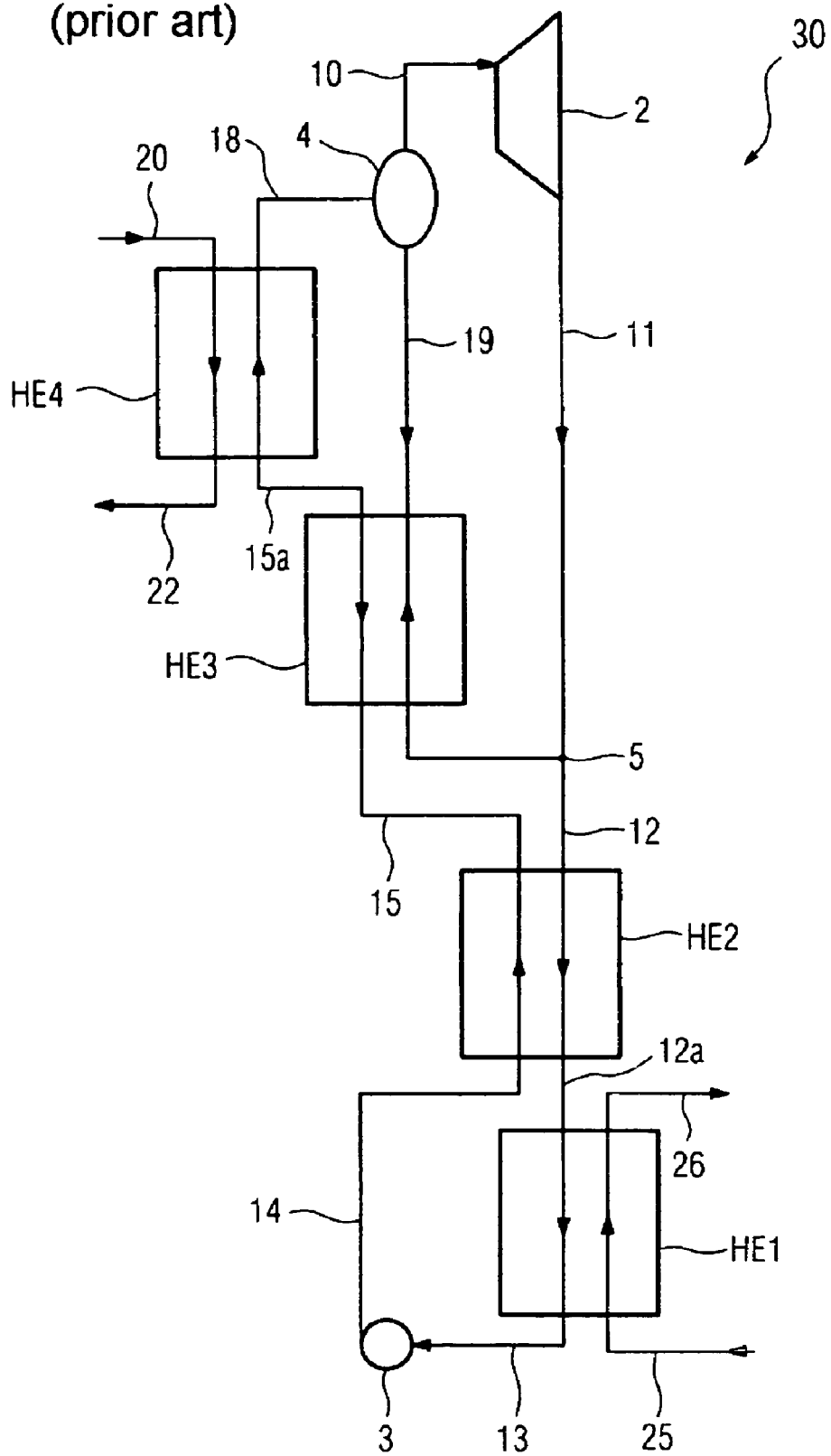
FIG. 3 shows a circuit for a device known from the prior art for executing a thermodynamic cycle process in a simplified, schematic presentation.

FIG. 3 by contrast shows the circuit of a device 30 known in the prior art as KCS 34 (Kalina Cycle System 34) for executing a thermodynamic cycle process. For better comparison of the known device with the inventive device shown in FIG. 1 components and flows which correspond to each other are identified by the same reference symbols. Device 30 differs from the inventive device shown in FIG. 1 in having an additional, heat exchanger HE3 located on the primary side between heat exchanger HE2 and heat exchanger HE4 and on the secondary side between separator 4 and mixer 5. With the aid of heat exchanger HE2 the pressurized, liquid working medium flow 14 is heated up by part condensation of the expanded working medium flow 12 and a heated (liquid) working medium flow 15 created. The heated working medium flow 15 is subsequently further heated by means of the heat exchanger HE3 by cooling down of the liquid phase 19 and thereby a further heated working medium flow 15a created.

Figure 4:
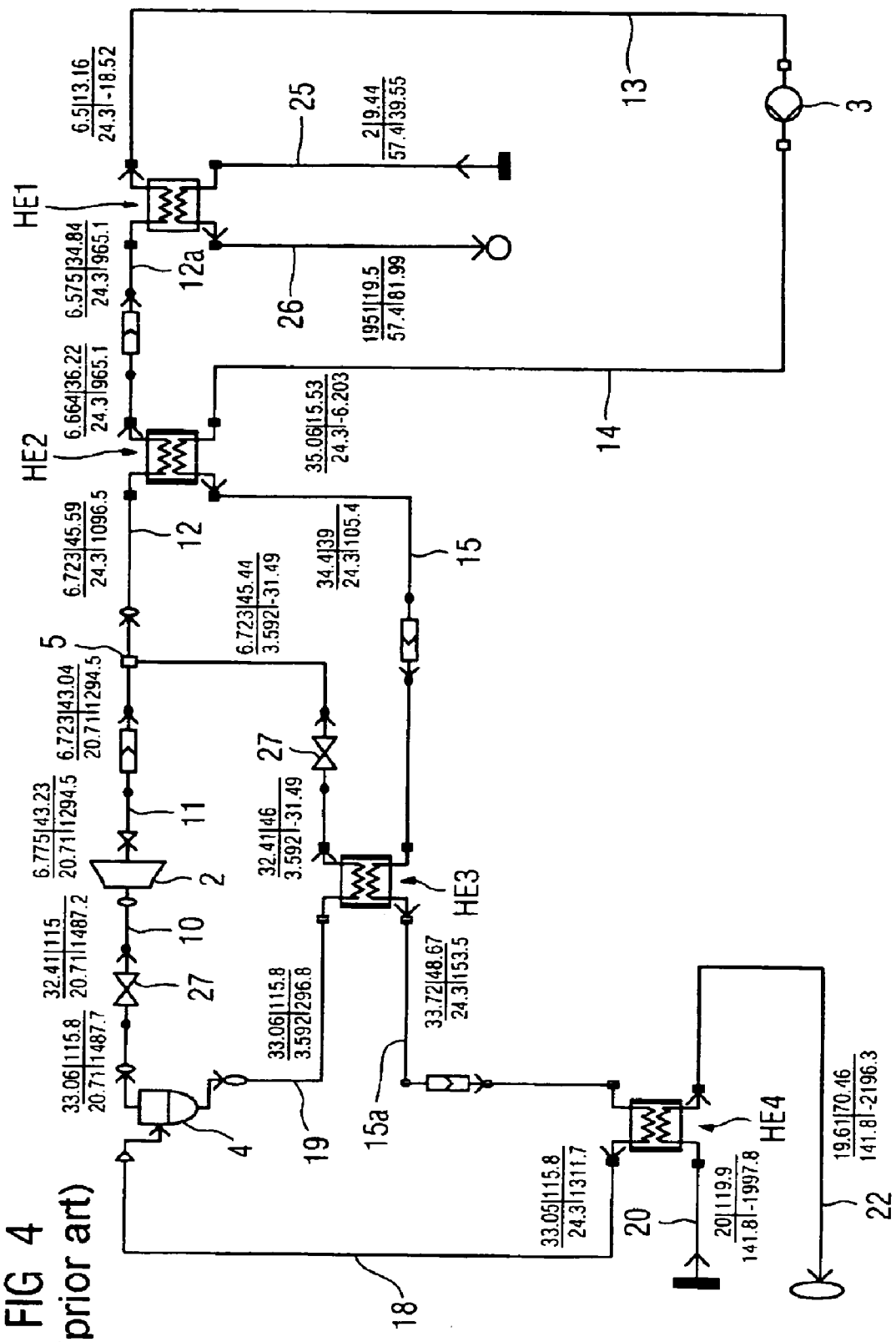
FIG. 4 shows a cycle calculation for a device in accordance with FIG. 3.

FIG. 4 shows a cycle calculation for a device known from the prior art which essentially corresponds to the device 30 shown in FIG. 3 and has additionally only been supplemented by a number of valves 27. The initial conditions assumed for the calculations were an ammonia concentration in the water of 89.2% and—as in the case of the cycle calculation of FIG. 2—a thermal water flow 20 with a temperature of 120° C. as well as a mass flow of 141.8 kg/s. The temperature of cooling water flow 25 is 9.4° C.

Table 3 shows for a number of selected flows of the cycle the result of the cycle calculation, with the power of the heat exchangers being selected in accordance with Table 4.

TABLE 3

| Flow | Temperature (° C.) | Enthalpy (kJ/kg) | Mass flow (kg/s) | Pressure (bar) |
|---|---|---|---|---|
| 10 | 115 | 1487.2 | 20.71 | 32.41 |
| 11 | 43.23 | 1294.5 | 20.71 | 6.775 |
| 13 | 13.16 | −18.52 | 24.3 | 6.5 |
| 15 | 39 | 105.4 | 24.3 | 34.4 |
| 15a | 48.67 | 153.5 | 24.3 | 33.72 |
| 20 | 119.9 | −1997.8 | 141.8 | 20 |
| 22 | 70.46 | −2196.3 | 141.8 | 19.61 |

TABLE 4

| Heat exchanger | Power (kW) |
|---|---|
| HE1 (condenser) | 24.1 |
| HE2 | 2.7 |
| HE3 | 1.2 |
| HE4 | 28.1 |
| Total | 55.1 |

The electrical power that can be generated in this case amounts to only 3818 kW. The obtainable electrical power is thus higher in the case of the inventive cycle according to FIGS. 1 and 2 by 5.6% than in the case of the cycle process known from the prior art.

The heated working medium flow 15 which leaves heat exchanger HE2 at a temperature of 39° C. is further heated up in heat exchanger HE3 through cooling down of the liquid phase 19 to 48.87° C. and fed as working medium flow 15a to heat exchanger HE4.

Whereas in the known case the temperature of the discharged thermal water 22 is still 70.46° C., in the case of the inventive cycle process as shown in FIG. 2 the discharged thermal water 22 only has a temperature of 57.45° C. In the case of the inventive cycle process comparatively more energy can thus be extracted from the thermal water.

As a result of the pressure of the vapor phase 10 at the input of the turbine 2 of 32.41 bar and of the pressure ratio of 4.8 between the pressure of the vapor phase at the input of the turbine 2 and the pressure of the expanded vapor phase 11 at the output of the turbine, a conventional single-stage cannot be used in the case of the cycle shown in FIG. 4. Either two conventional single-stage turbines connected in series must be used, or a single turbine specifically for high pressures and pressure ratios greater than 4 must be used, which in both cases is associated with higher costs and efficiency losses compared to a single conventional turbine.

The increased heating surface requirement of 28.5% also resulting from the increased heat exchanger power results in a greater need for investment. These increased costs can however be balanced out in a large part by the simplified pipework and the omission of heat exchanger HE3, so that the plant costs overall remain essentially the same.

The invention has been described above with reference to preferred exemplary embodiments, but can generally be seen as not being restricted to these exemplary embodiments. Instead there is the option of a plurality of variations and modifications of the invention or of these exemplary embodiments. For example—as also occurs in the typical circuit shown in FIG. 2—additional valves can be connected into the circuit.

The invention claimed is:

1. A method for performing a thermodynamic cycle process, the method comprising:
   pumping a flow of liquid working medium at an increased pressure and forming a pressurized, liquid working medium flow;
   heating up and partly vaporizing the pressurized, liquid working medium flow by partly condensing an expanded working medium flow;
   creating a first partly vaporized working medium flow and a partly condensed, expanded working medium flow;
   directly transferring an entirety of the first partly vaporized working medium flow to a heat exchanger for further vaporizing the first partly vaporized working medium flow with heat which is transferred from an external heat source;
   creating a second at least partly vaporized working medium flow;
   separating a liquid phase from a vapor phase of the second at least partly vaporized working medium flow;
   expanding the vapor phase;
   converting an energy of the vapor phase into a usable form;
   creating an expanded vapor phase;
   mixing the liquid phase with the expanded vapor phase;
   creating the expanded working medium flow;
   completely condensing the partly condensed, expanded working medium flow; and creating the liquid working medium flow.

2. The method in accordance with claim 1, wherein the pressure of the vapor phase is less than 24 bar.

3. The method in accordance with claim 1, wherein the pressure of the vapor phase is three to four times as great as the pressure of the expanded vapor phase.

4. The method in accordance with claim 2, wherein the pressure of the vapor phase is three to four times as great as the pressure of the expanded vapor phase.

5. The method in accordance with claim 1, wherein a multi-substance mixture is used as working medium flow.

6. The method in accordance with claim 2, wherein a multi-substance mixture is used as working medium flow.

7. The method in accordance with claim 5, wherein a two-substance mixture is used as a multi-substance mixture.

8. The method in accordance with claim 7, wherein the two-substance mixture is an ammonia-water mixture.

9. The method in accordance with claim 1, wherein a geothermal liquid is used as an external heat source.

10. The method in accordance with claim 9, wherein the geothermal liquid is thermal water.

11. The method in accordance with claim 1, wherein the heat source has a temperature of 100° C. to 140° C.

12. A method for executing a thermodynamic cycle process with at least the following steps:
    pumping a flow of liquid working medium at an increased pressure and forming a pressurized, liquid working medium flow;
    heating up and part vaporization of the pressurized, liquid working medium flow by part condensation of an expanded working medium flow and creation of a first partly vaporized working medium flow and of a partly condensed, expanded working medium flow;
    further vaporization of the partly vaporized working medium flow with heat which is transferred from an external heat source, and creation of a second at least partly vaporized working medium flow;
    separation of a liquid phase from a vapor phase of the second at least partly vaporized working medium flow;
    expansion of the vapor phase, conversion of its energy into a usable form and creation of an expanded vapor phase;
    mixing of the liquid phase with the expanded vapor phase and formation of the expanded working medium flow;
    complete condensation of the partly condensed, expanded working medium flow and creation of the liquid working medium flow.

13. A device for executing a thermodynamic cycle process, comprising:
    a pump for pumping a flow of liquid working medium at an increased pressure and creating a pressurized liquid working medium flow;
    a first heat exchanger for creating a first partly vaporized working medium flow by heating up and part vaporization of the pressurized liquid working medium flow through part condensation of an expanded working medium flow;
    a second heat exchanger for creating a second at least partly vaporized working medium flow through further vaporization of the first partly vaporized working medium flow, that is transferred in its entirety directly from the first heat exchanger, with heat which is transferred from an external heat source;
    a separator for separation of a liquid phase from a vapor phase of the second at least partly vaporized working medium flow;
    a mechanism for expanding the vapor phase, converting its energy into a usable form and creating an expanded vapor phase;
    a mixer for mixing the liquid phase with the expanded vapor phase and creating an expanded working medium flow; and
    a third heat exchanger for completely condensing the partly condensed, expanded working medium flow and creating a liquid working medium flow.

14. The device in accordance with claim 13, wherein the mechanism is a turbine.

15. The device in accordance with claim 13, with the pressure of the vapor phase amounting to less than 24 bar.

16. The device in accordance with claim 13, with the pressure of the vapor phase being three to four times as great as the pressure of the expanded vapor phase.

17. The device in accordance with claim 13, wherein the working medium comprises a multi-substance mixture.

18. The device in accordance with claim 17, wherein the multi-substance mixture is a two-substance mixture.

19. The device in accordance with claim 13, wherein a geothermal liquid is used as external heat source.

20. The device in accordance with claim 13, wherein the external heat source has a temperature of 100° C. to 140° C.

* * * * *